US012342131B2

(12) United States Patent
Lin et al.

(10) Patent No.: US 12,342,131 B2
(45) Date of Patent: Jun. 24, 2025

(54) TEMPERATURE SENSOR BASED EAR-WORN ELECTRONIC DEVICE FIT ASSESSMENT

(71) Applicant: STARKEY LABORATORIES, INC., Eden Prairie, MN (US)

(72) Inventors: Andy S. Lin, Eden Prairie, MN (US); Peter Flanagan, Eden Prairie, MN (US); Michael Karl Sacha, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 288 days.

(21) Appl. No.: 18/025,594

(22) PCT Filed: Aug. 11, 2021

(86) PCT No.: PCT/US2021/045485
§ 371 (c)(1),
(2) Date: Mar. 9, 2023

(87) PCT Pub. No.: WO2022/066307
PCT Pub. Date: Mar. 31, 2022

(65) Prior Publication Data

US 2023/0336924 A1 Oct. 19, 2023

Related U.S. Application Data

(60) Provisional application No. 63/084,125, filed on Sep. 28, 2020.

(51) Int. Cl.
*H04R 1/10* (2006.01)
*H04R 25/00* (2006.01)

(52) U.S. Cl.
CPC ............ *H04R 25/30* (2013.01); *H04R 25/65* (2013.01); *H04R 2225/83* (2013.01)

(58) Field of Classification Search
CPC ................ H04R 25/603; H04R 25/652; H04R 2225/0213; H04R 2225/025; H04R 2225/83; H04R 2460/15
See application file for complete search history.

(56) References Cited

U.S. PATENT DOCUMENTS 5,469,855 A 11/1995 Pompei et al.
6,532,294 B1 * 3/2003 Rudell .................. A23G 9/503 381/314

(Continued)

FOREIGN PATENT DOCUMENTS

CH 717566 A2 12/2021
CN 110999315 A 4/2020

(Continued)

OTHER PUBLICATIONS

International Application No. PCT/US2021/045485, filed Aug. 11, 2021, International Search Report and Written Opinion, issued Mar. 31, 2022, 18 pages.

*Primary Examiner* — Ryan Robinson
(74) *Attorney, Agent, or Firm* — Mueting Raasch Group

(57) ABSTRACT

An ear-worn electronic device comprises a housing configured to fit at least partially in an ear of a wearer, a power source situated in the housing, and a temperature sensor arrangement situated in or on the housing and coupled to the power source. The temperature sensor arrangement is configured to generate sensor signals in response to heat generated in the wearer's ear and a controller, situated in the housing and coupled to the power source and the temperature sensor arrangement, is configured to assess a fit of the device using the sensor signals.

23 Claims, 7 Drawing Sheets

(56) References Cited

U.S. PATENT DOCUMENTS

| | | | | |
|---|---|---|---|---|
| 6,556,852 | B1 | 4/2003 | Schulze et al. | |
| 7,522,739 | B2 * | 4/2009 | Rass | H04R 25/558<br>381/328 |
| 7,660,426 | B2 | 2/2010 | Hannibal et al. | |
| 8,306,774 | B2 | 11/2012 | Quinn et al. | |
| 9,288,584 | B2 | 3/2016 | Hansen et al. | |
| 9,439,009 | B2 | 9/2016 | Kim et al. | |
| 9,635,469 | B2 | 4/2017 | Lunner et al. | |
| 9,723,415 | B2 | 8/2017 | Gran et al. | |
| 9,781,521 | B2 * | 10/2017 | Kofod-Hansen | H04R 25/305 |
| 9,838,771 | B1 | 12/2017 | Masaki et al. | |
| 9,860,650 | B2 * | 1/2018 | Bürger | H04R 25/552 |
| 10,219,069 | B2 | 2/2019 | Urup | |
| 10,455,337 | B2 | 10/2019 | Yoo | |
| 11,463,820 | B2 * | 10/2022 | Thomsen | H04R 25/453 |
| 11,470,413 | B2 | 10/2022 | Andersen | |
| 11,638,085 | B2 | 4/2023 | Monsarrat-Chanon | |
| 11,722,809 | B2 | 8/2023 | Andersen | |
| 11,998,354 | B2 * | 6/2024 | Petersen | A61B 5/02416 |
| 2003/0016728 | A1 | 1/2003 | Gerlitz | |
| 2005/0123146 | A1 | 6/2005 | Voix et al. | |
| 2011/0044483 | A1 | 2/2011 | Edgar | |
| 2011/0058681 | A1 | 3/2011 | Naylor | |
| 2016/0309266 | A1 | 10/2016 | Olsen | |
| 2016/0373869 | A1 | 12/2016 | Gran et al. | |
| 2017/0258329 | A1 | 9/2017 | Marsh | |
| 2019/0076058 | A1 | 3/2019 | Piechowiak | |
| 2019/0110692 | A1 | 4/2019 | Pardey et al. | |
| 2021/0014619 | A1 | 1/2021 | Sacha | |
| 2022/0264232 | A1 | 8/2022 | Guo | |
| 2022/0386048 | A1 | 12/2022 | Griffin | |

FOREIGN PATENT DOCUMENTS

| | | | | |
|---|---|---|---|---|
| DE | 3840393 | A1 * | 6/1989 | |
| DE | 102012215976 | A1 * | 3/2014 | H04R 25/65 |
| JP | 2009 232298 | A | 10/2009 | |
| WO | WO 2006091106 | A1 | 8/2006 | |
| WO | WO 2010049543 | A2 | 5/2010 | |
| WO | WO 2012 044278 | A1 | 4/2012 | |
| WO | WO 2022042862 | A1 | 3/2022 | |

* cited by examiner

*Figure 5A*
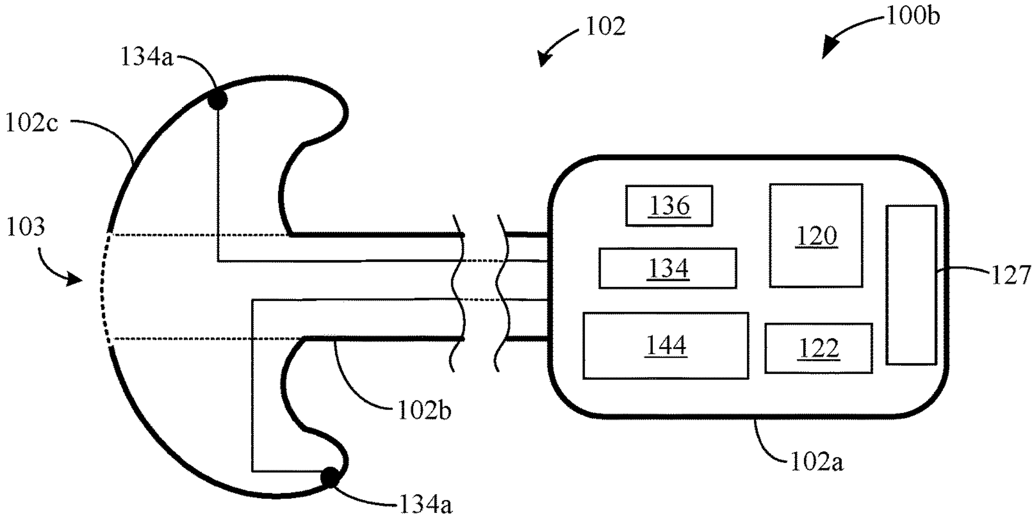
*Figure 6*
*Figure 5B*
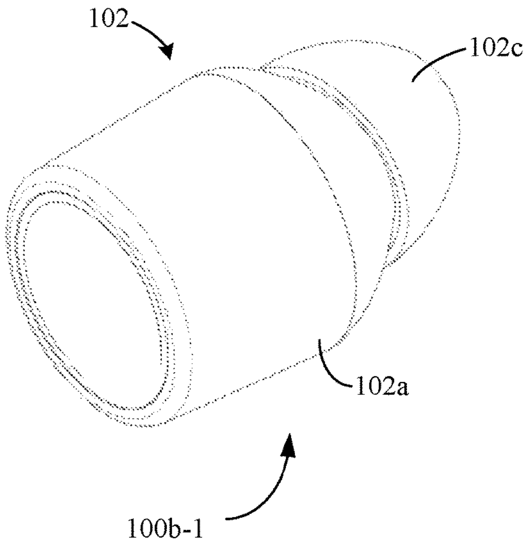
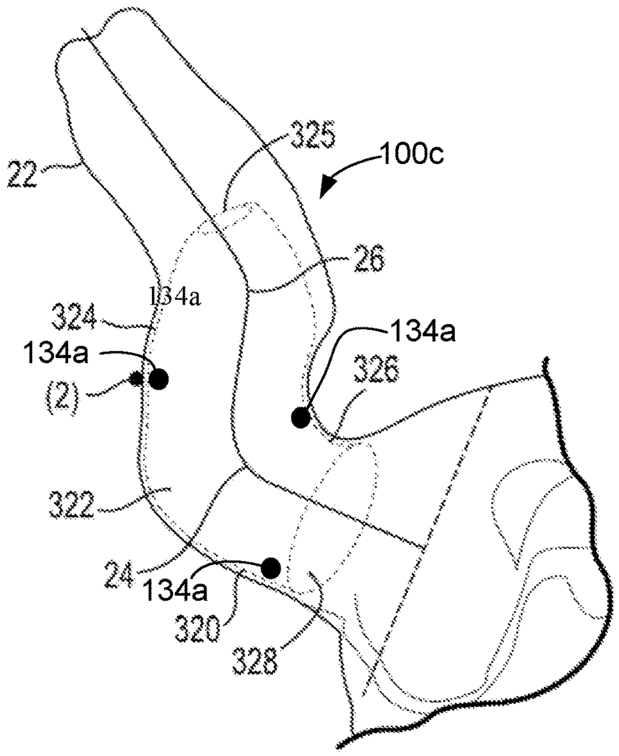

TEMPERATURE SENSOR BASED EAR-WORN ELECTRONIC DEVICE FIT ASSESSMENT

RELATED APPLICATIONS

This application is the § 371 U.S. National Stage of International Application No. PCT/US2021/045485, filed Aug. 11, 2021, which claims the benefit of U.S. Provisional Application No. 63/084,125, filed Sep. 28, 2020, the entire content of each which is hereby incorporated by reference.

TECHNICAL FIELD

This application relates generally to ear-level electronic systems and devices, including hearing devices, personal amplification devices, hearing aids, hearables, physiologic monitoring devices, biometric devices, position and/or motion sensing devices, and other ear-worn electronic devices.

SUMMARY

Embodiments are directed to an ear-worn electronic device comprising a housing configured to fit at least partially in an ear of a wearer, a power source situated in the housing, and a temperature sensor arrangement situated in or on the housing and coupled to the power source. The temperature sensor arrangement is configured to generate sensor signals in response to heat generated in the wearer's ear and a controller, situated in the housing and coupled to the power source and the temperature sensor arrangement, is configured to assess a fit of the device using the sensor signals.

Embodiments are directed to an ear-worn electronic device comprising a housing configured to fit at least partially in an ear of a wearer, a power source situated in the housing, and a temperature sensor arrangement coupled to the power source and comprising at least two temperature sensors situated in or on the housing and spaced apart from one another. The temperature sensors are configured to generate sensor signals in response to heat generated in the wearer's ear and a controller, situated in the housing and coupled to the power source and the temperature sensor arrangement, is configured to assess a fit of the device using the sensor signals.

Embodiments are directed to a method implemented by an ear-worn electronic device configured for deployment in, on or about an ear of a wearer. The method comprises generating sensor signals by a temperature sensor arrangement of the device in response to heat generated in the wearer's ear, receiving the sensor signals by a controller, assessing, by the controller, a fit of the device in the wearer's ear using the sensor signals, and generating, by the controller, an output indicative of the device fit assessment.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 5A illustrates an ear-worn electronic device in the form of an earbud in accordance with any of the embodiments disclosed herein;

FIG. 5B illustrates an ear-worn electronic device in the form of an earbud in accordance with any of the embodiments disclosed herein;

FIG. 6 illustrates an ear-worn electronic device in the form of an in-canal device in accordance with any of the embodiments disclosed herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
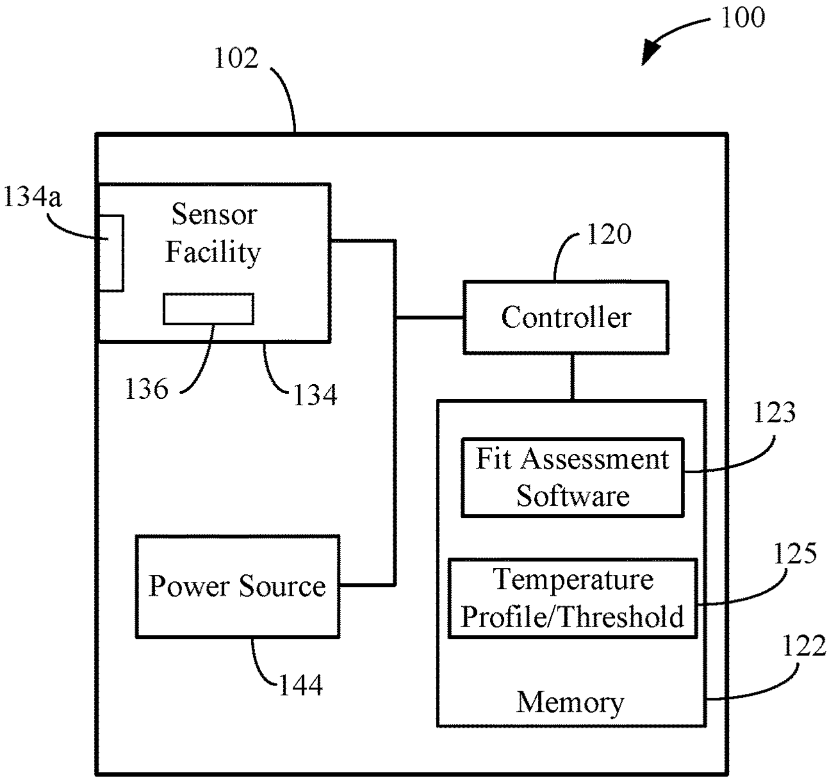
FIG. 1 is a block diagram of an ear-worn electronic device configured to implement a temperature sensor-based device fit assessment in accordance with any of the embodiments disclosed herein.

Embodiments of the disclosure are directed to an ear-worn electronic device configured to implement an objective device fit evaluation. The fit for any in-ear device is essential for many reasons, such as comfort of the wearer, sound quality, and accuracy of biometric measurements, among others. For example, and in the context of a hearing aid, signal processing parameters of various signal processing algorithms are typically determined during an initial fitting session in an audiologist's office and programmed into the hearing aid by activating desired algorithms and setting algorithm parameters in a non-volatile memory of the hearing aid. Generally, the audiologist spends relatively little time on physically fitting the hearing aid to the wearer in comparison to the time required to properly program the hearing aid to properly compensate for the wearer's hearing loss. Moreover, the quality of the fit can be difficult to assess even for trained specialists. Relying on subjective feedback from the wearer to self-assess the fit is inherently problematic and unreliable.

In the context of consumer hearables, such as earbuds, different sizes and styles of tips and anchoring wings are often provided. However, it takes some guesswork and experimentation with different combinations of tips and/or anchoring wings to find a potentially good match for a particular wearer's ears. A poorly fitted device can ruin the user experience. An ear-worn electronic device (e.g., a consumer earbud) which has a poor fit can be described as a device which is not securely situated in the desired location and which undesirably displaces under influence of motion.

Embodiments of the present disclosure are directed to ear-worn electronic devices and methods implemented by such devices for performing an unbiased, objective fit assessment. A fit assessment in accordance with any of the embodiments disclosed herein can be implemented by the ear-worn electronic device without the assistance or presence of a trained specialist.

According to any of the embodiments disclosed herein, an ear-worn electronic device includes a temperature sensor arrangement configured to generate sensor signals in response to heat generated in a wearer's ear. The temperature sensor arrangement can include one, two, three, four or more temperature sensors configured to sense heat generated in the wearer's ear. A controller operably coupled to the temperature sensor arrangement is configured to assess a fit of the device using the sensor signals. The controller can be a component of the ear-worn electronic device, a controller of an external electronic device communicatively coupled to the ear-worn electronic device, or controllers of the ear-worn and external electronic devices operating cooperatively.

For example, a controller of the ear-worn electronic device can be configured to assess the fit of the device using sensor signals generated by the temperature sensor arrangement. In some implementations, a controller of an external device communicatively coupled to the ear-worn electronic device can be configured to assess a fit of the device using the sensor signals. The controller of the ear-worn electronic device and/or the external device can be configured to generate information about the fit of the device in response to the device fit assessment. Device fit information can be communicated to the wearer, such as by an audio output device of the ear-worn electronic device and/or a display/speaker of an external electronic device.

Evaluation of sensor signals generated by the temperature sensor arrangement can be used by a controller of the ear-worn electronic device and/or an external electronic device to determine whether the fit of the device is a proper fit or an improper fit. The outcome of this device fit evaluation can be communicated to the wearer. If an improper fit is detected, the wearer can adjust the fit of the device and the device fit assessment can be repeated.

Embodiments of the disclosure are defined in the Examples. However, below there is provided a non-exhaustive listing of non-limiting examples. Any one or more of the features of these examples may be combined with any one or more features of another example, embodiment, or aspect described herein.

Example Ex1

An ear-worn electronic device comprises a housing configured to fit at least partially in an ear of a wearer, a power source situated in the housing, and a temperature sensor arrangement situated in or on the housing and coupled to the power source. The temperature sensor arrangement is configured to generate sensor signals in response to heat generated in the wearer's ear and a controller, situated in the housing and coupled to the power source and the temperature sensor arrangement, is configured to assess a fit of the device using the sensor signals.

Example Ex2

An ear-worn electronic device comprises a housing configured to fit at least partially in an ear of a wearer, a power source situated in the housing, and a temperature sensor arrangement coupled to the power source and comprising at least two temperature sensors situated in or on the housing and spaced apart from one another. The temperature sensors are configured to generate sensor signals in response to heat generated in the wearer's ear and a controller, situated in the housing and coupled to the power source and the temperature sensor arrangement, is configured to assess a fit of the device using the sensor signals.

Example Ex3

The device according to Ex1 or Ex2, wherein the controller is configured to detect whether the fit of the device is a proper fit or an improper fit using the sensor signals.

Example Ex4

The device according to any one or any combination of the preceding Examples, wherein the controller is configured to generate a time-varying characterization of temperature within the wearer's ear using the sensor signals, assess the fit of the device using the temperature characterization.

Example Ex5

The device according to Ex2, wherein the controller is configured to generate a plurality of time-varying characterizations of temperature within the wearer's ear using sensor signals produced by each of the temperature sensors, measure differences between the temperature characterizations, and assess the fit of the device using the temperature characterization differences.

Example Ex6

The device according to any one or any combination of the preceding Examples, wherein the controller is configured to generate a temperature profile using the sensor signals, compare the temperature profile to a temperature profile pre-established for the device, and assess the fit of the device using a result of the comparison.

Example Ex7

The device according to any one or any combination of the preceding Examples, wherein the controller is configured to generate a temperature profile using the sensor signals, compare the temperature profile to a temperature profile pre-established for the device and for the wearer, and assess the fit of the device using a result of the comparison.

Example Ex8

The device according to Ex6 or Ex7, wherein the generated and pre-established temperature profiles comprise steady-state temperature profiles.

Example Ex9

The device according to Ex6 or Ex7, wherein the generated and pre-established temperature profiles comprise dynamic temperature profiles representative of warming of the device prior to achieving a steady state temperature.

Example Ex10

The device according to any one or any combination of Ex1 through Ex3, wherein the controller is configured to generate a temperature gradient using the sensor signals, compare the temperature gradient to a threshold, and assess the fit of the device using a result of the comparison.

Example Ex11

The device according to Ex2, wherein the controller is configured to generate a temperature gradient using sensor signals produced by two of the temperature sensors, compare the temperature gradient to a threshold, and assess the fit of the device using a result of the comparison.

Example Ex12

The device according to Ex2, wherein temperature sensor comprises three or more temperature sensors situated in or on the housing and spaced apart from one another, and the controller is configured to generate a plurality of temperature gradients using temperature signals produced by respective pairs or combinations of the three or more temperatures sensors, compare the temperature gradients to at least one threshold, and assess the fit of the device using a result of the comparison.

Example Ex13

The device according to any one or any combination of Ex10 through Ex12, wherein the threshold is a threshold pre-established for the device.

Example Ex14

The device according to any one or any combination of Ex10 through Ex12, wherein the threshold is a threshold pre-established for the device and the wearer.

Example Ex15

The device according to any one or any combination of the preceding Examples, wherein the housing is configured to provide a sealed fit with respect to the wearer's ear, and the controller is configured to assess the sealed fit of the device using the sensor signals.

Example Ex16

The device according to any one or any combination of Ex1 through Ex14, wherein the housing is configured to provide an unsealed fit with respect to the wearer's ear, and the controller is configured to assess the unsealed fit of the device using the sensor signals.

Example Ex17

The device according to any one or any combination of the preceding Examples, wherein the device is a restricted medical hearing device.

Example Ex18

The device according to any one or any combination of the preceding Examples, wherein the device is a hearing aid.

Example Ex19

The device according to any one or any combination of Ex1 through Ex16, wherein the device is an over-the-counter (OTC) hearing device.

Example Ex20

The device according to any one or any combination of Ex1 through Ex16, wherein the device is a consumer hearing device.

Example Ex21

The device according to any one or any combination of Ex1 through Ex16, wherein the device is a consumer sound amplifier.

Example Ex22

The device according to any one or any combination of Ex1 through Ex16, wherein the device is a consumer earbud.

Example Ex23

The device according to any one or any combination of the preceding Examples, wherein the device comprises an audio processing facility, and the controller is configured to produce an output indicative of the fit assessment and communicate the output to an ear drum of the wearer's ear via the audio processing facility.

Example Ex24

The device according to any one or any combination of the preceding Examples, wherein the device comprises a wireless communication device, and the controller is configured to produce a signal indicative of the fit assessment and cooperate with the wireless communication device to transmit the signal to an external device or system.

Example Ex25

The device according to any one or any combination of the preceding Examples, comprising detecting a trigger event by the controller and initiating device fit assessment by the controller in response to the trigger event.

Example Ex26

The device according to Ex25, wherein the trigger event comprises a change in temperature measured by the temperature sensor arrangement relative to a threshold.

Example Ex27

The device according to Ex25, wherein the trigger event comprises a rate of change in temperature measured by the temperature sensor arrangement relative to a threshold.

Example Ex28

The device according to Ex26 or Ex27, wherein the device comprises an auxiliary sensor configured to generate auxiliary sensor signals, and the trigger event is detected by the controller in response to the temperature sensor signals and the auxiliary sensor signals.

Example Ex29

The device according to Ex25, wherein detecting the trigger event comprises detecting an initiation signal by the controller.

Example Ex30

The device according to Ex29, wherein the initiation signal comprises a signal generated by a button of the device in response to a wearer input.

Example Ex31

The device according to Ex29, wherein the initiation signal comprises a signal received from an external communication device.

Example Ex32

A method implemented by an ear-worn electronic device configured for deployment in, on or about an ear of a wearer comprises generating sensor signals by a temperature sensor arrangement of the device in response to heat generated in the wearer's ear, receiving the sensor signals by a controller, assessing, by the controller, a fit of the device in the wearer's ear using the sensor signals, and generating, by the controller, an output indicative of the device fit assessment.

Example Ex33

The method of Ex32, wherein the controller is configured to implement any one or any combination of the processes recited in Ex1 through Ex16 and Ex23 through Ex31.

FIG. 1 is a block diagram of an ear-worn electronic device 100 configured to implement a temperature sensor-based device fit assessment in accordance with any of the embodiments disclosed herein. The device 100 is representative of a wide variety of electronic devices configured to be deployed in, on or about an ear of a wearer. In some implementations, the device 100 can be deployed in, on or about one ear of the wearer (e.g., left or right ear). In other implementations, a first device 100 can be deployed in, on or about the wearer's left ear, and a second device 100 can be deployed in, on or about the wearer's right ear. The first and second devices 100 can operate cooperatively (e.g., via an inductive or radio frequency ear-to-ear link) or independently. The temperature sensor or sensors used to assess device fit are incorporated in each of the two devices 100, whereby a fit assessment is performed by a controller of each of the devices 100. In some implementations, the controller that operates on sensor signals to perform the fit assessment can be incorporated in only one of two devices 100. In further implementations, the controller that operates on sensor signals to perform the fit assessment can be incorporated in an external electronic device, such as a smartphone, tablet, laptop or desktop computer.

The term ear-worn electronic device (e.g., device 100) refers to a wide variety of electronic devices configured for deployment in, on or about an ear of a wearer. Representative ear-worn electronic devices of the present disclosure include, but are not limited to, in-the-canal (ITC), completely-in-the-canal (CIC), invisible-in-canal (IIC), in-the-ear (ITE), receiver-in-canal (RIC), behind-the-ear (BTE), and receiver-in-the-ear (RITE) type devices. Representative ear-worn electronic devices of the present disclosure include, but are not limited to, earbuds, electronic ear plugs, personal sound amplification devices, and other ear-worn electronic appliances. Ear-worn electronic devices of the present disclosure include various types of hearing devices, various types of physiologic monitoring and biometric devices, and combined hearing/physiologic monitoring devices. Ear-worn electronic devices of the present disclosure include restricted medical devices (e.g., devices regulated by the U.S. Food and Drug Administration), such as hearing aids. Ear-worn electronic devices of the present disclosure include consumer electronic devices, such as consumer earbuds, consumer sound amplifiers, and consumer hearing devices (e.g., consumer hearing aids and over-the-counter (OTC) hearing devices), for example.

The ear-worn electronic device 100 shown in FIG. 1 includes a housing 102 configured for deployment in, on or about an ear of a wearer. According to any of the embodiments disclosed herein, the housing 102 can be configured for deployment at least partially within the wearer's ear. For example, the housing 102 can be configured for deployment at least partially or entirely within an ear canal of the wearer's ear. The housing 102 can be configured for deployment at least partially within the outer ear, such as from the helix to the ear canal (e.g., the concha cymba, concha cavum) and can extend up to or into the ear canal. In some configurations, the shape of the housing 102 can be customized for the wearer's ear canal (e.g., based on a mold taken from the wearer's ear canal). In other configurations, the housing 102 can be constructed from pliant (e.g., semisoft) material that, when inserted into the wearer's ear canal, takes on the shape of the ear canal.

The housing 102 is configured to contain or support a number of components including a sensor facility 134 comprising at least one or more temperature sensors 134*a*. The sensor facility 134 can include or be coupled to signal processing circuitry 136 configured to process sensor signals prior to communication of the sensor signals to a controller 120 coupled to a memory 122. The memory 122 is configured to store fit assessment software 123, which includes program instructions executable by the controller 120. As will be described in greater detail hereinbelow, the controller 120 is configured to execute fit assessment program instructions 123 to assess the fit of the device 100 in, on or about the wearer's ear using the sensor signals produced by the sensor facility 134. In some embodiments, a predetermined temperature profile (e.g., a curve or equation), template, pattern or threshold 125 is stored in the memory 122 and used by the controller 120 as part of a device fit assessment procedure. A power source 144, such as a rechargeable battery (e.g., lithium-ion battery), is configured to provide power to various components of the device 100.

Figure 2:
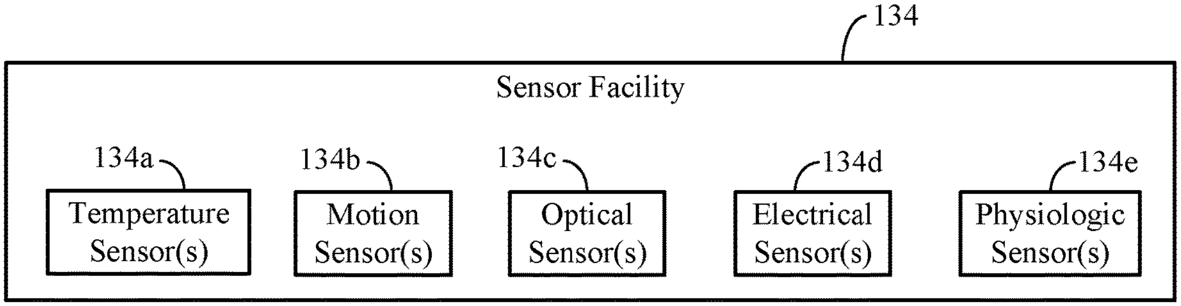
FIG. 2 shows a sensor facility of the device shown in FIG. 1 which can include one or more auxiliary sensors in addition to one or more temperature sensors in accordance with any of the embodiments disclosed herein.

In accordance with any of the embodiments disclosed herein, and after deploying (e.g., inserting) the device 100 in the wearer's ear, the controller 120 is configured to implement a device fit assessment procedure. In some implementations, instructions for participating in the device fit assessment procedure can be communicated to the wearer, such as audibly if the device 100 is equipped with an audio output device and/or visually via a smartphone or other electronic device communicatively coupled to the ear-worn electronic device 100. During the device fit assessment procedure implemented by the controller 120, the sensor facility 134 actively senses temperature in the wearer's ear and generates sensor signals in response to heat generated in the wearer's ear. In some implementations, one or more auxiliary sensors of the sensor facility 134 (see, e.g., the sensors shown in FIG. 2) can be active and produce additional sensor signals used by the controller 120 in connection with the device fit assessment.

The controller 120 is configured to assess the fit of the device 100 using sensor signals received from the sensor facility 134. The controller 120 can be configured to detect whether the fit of the device 100 is a proper fit or an improper fit using the sensor signals. The controller 120 can generate an output indicative of the device fit assessment (e.g., an output indicating a good fit or a poor fit). For example, the output produced by the controller 120 can include an audible output and/or a tactile output. Although the device fit assessment procedure is implemented by the controller 120 during initial deployment of the device 100 in a wearer's ear, assessing the device fit can be performed at any time thereafter, such as when movement of the wearer's head or jaw is detected by the sensor facility 134 (e.g., by a motion sensor 134*b* during exercise or eating/chewing which can alter the device fit).

The sensor facility 134 includes one or more temperature sensors 134*a*, such as one or more thermistors. A suitable thermistor 134*a* is a glass encapsulated thermistor, which includes a chip (e.g., a negative temperature coefficient (NTC) chip) encapsulated within a bead of glass. Leads (e.g., dumet leads) are coupled to the chip and to circuitry within the temperature sensor 134*a* of the sensor facility 134 (e.g., signal processing circuitry 136). A suitable thermistor 134*a* is a surface mount device (SMD) thermistor, which can be used for temperature sensing alone or in combination with other types of thermistors or temperature sensors. Other temperature sensors 134*a* can be used in the sensor facility 134, including thermocouples, resistance temperature detectors (RTDs), digital thermistors, and other types of resistance temperature sensors. An ear-worn device 100 of the present disclosure can incorporate any one or any combination of these types of temperature sensors. For example, passive thermistors as small as 1.6 mm×0.8 mm×0.8 mm that only require one additional resistor can be used, which are particularly useful for incorporation in an ear-worn device 100.

As will be discussed hereinbelow, the temperature sensor-based device fit assessment embodiments disclosed herein need not require an absolute temperature measurement, such as body core temperature. Rather, a relative temperature measurement can be used as by temperature sensor-based device fit assessment embodiments of the present disclosure. Accordingly, relatively low-cost, reduced-precision temperature sensors (e.g., thermistors) can be incorporated in the sensor facility 134 of the ear-worn electronic device 100. Use of relatively low-cost, reduced-precision temperature sensors advantageously reduces the cost and complexity of an ear-worn electronic device configured to perform a temperature sensor-based device fit assessment (e.g., in particular an in-situ temperature sensor-based device fit assessment).

In an ear-worn device 100 that incorporates a thermistor, the leads or contacts of the thermistor are coupled to an analog-to-digital converter (ADC) and a processor (e.g., signal processing circuitry 136). Changes in thermistor resistance correspond to changes in temperature. Thermistor resistance can be converted to temperature by the processor using the well-known Steinhart-Hart equation (e.g., via a lookup table). The Steinhart-Hart equation is considered the best mathematical expression for the resistance-temperature relationship of NTC thermistors. The coefficients of the Steinhart-Hart equation vary with thermistor type and are typically provided by the manufacturer or readily derivable. A thermistor or other temperature sensor 134*a* can be mounted on, to or supported by the housing 102 of the ear-worn device 100 in a variety of ways. For example, a temperature sensor 134*a* can be mounted on an outer surface of the housing 102 and covered with a protective, thermally conductive outer layer. The temperature sensor 134*a* can be mounted within a wall of the housing 102 or within the interior of the housing 102. In such implementations, the temperature sensor 134*a* can be covered and/or surrounded with thermally conductive material to provide thermal coupling between the temperature sensor and the thermal environment at or outside of the housing 102. Representative examples of various temperature sensors 134*a*, mounting configurations, and signal processing techniques are disclosed in commonly owned, co-pending U.S. patent application Ser. No. 16/160,695 filed Oct. 15, 2018, which is incorporated herein by reference.

The sensor facility 134 can include auxiliary sensors in addition to one or more temperature sensors 134*a*. For example, and with reference to FIG. 2, the sensor facility 134 can include one or more motion sensors 134*b*, one or more optical sensors 134*c*, and one or more electrical sensors 134*d*. The one or more motion sensors 134*b* can include one or more of accelerometers, gyros, and magnetometers. For example, the motion sensor 134*b* can be implemented to include a multi-axis (e.g., 9-axis) sensor, such as an IMU (inertial measurement unit). A suitable IMU is disclosed in commonly owned U.S. Pat. No. 9,848,273, which is incorporated herein by reference. The one or more optical sensors 134*c* can include a photoplethysmography (PPG) sensor, such as a pulse oximeter. The one or more electrical sensors 134*d* can include one or more sensors configured to contact the skin of the wearer's ear and sense a change in an electrical property of the skin. For example, the one or more electrical sensors 134*d* can be configured to sense one or any combination of impedance, conductance, resistance, and electrodermal activity (e.g., galvanic skin response).

In some implementations, the ear-worn electronic device 100 can be implemented as a physiologic (e.g., biometric) monitoring device. In such implementations, the sensor facility 134 of the device 100 can include one or more physiologic or biometric sensors 134*e* in addition to one or more temperature sensors 134*a*. The physiologic/biometric sensors 134*e* can include one or more of an EKG or ECG sensor, an $SpO_2$ sensor, a blood pressure sensor, a respiration sensor, a glucose sensor, an EEG sensor, an EMG sensor, and an EOG sensor. Representative examples of such sensors are disclosed in US Pat. Pub. Nos. 2018/0014784 (Heeger et al.), 2013/0216434 (Ow-Wing), and 2010/0253505 (Chou), and in U.S. Pat. No. 9,445,768 (Alexander et al.) and U.S. Pat. No. 9,107,586 (Bao), each of which is incorporated herein by reference in its entirety. As will be discussed hereinbelow, the device 100 can include or exclude a hearing assistance or audio processing/output facility.

Signals generated by any one or any combination of the motion sensors 134*b*, optical sensors 134*c*, electrical sensors 134*d*, and physiologic sensors 134*e* can be used by the controller 120 together with one or more temperature sensors 134*a* to assess the fit of the device 100. For example, one or more auxiliary sensors 134*b*-134*e* may be used by the controller 120 to assess device fit in situations where temperature sensing alone may not provide sufficient information for providing a reliable device fit assessment. By way of example, an impedance, conductance, resistance, or electrodermal activity sensor can be used by the controller 120 when the ambient temperature is the same as or close to the wearer's internal ear temperature. Measurements of impedance, conductance, resistance, or electrodermal activity made by the controller 120 can be used to detect good or poor contact between the housing 102 and tissue of the wearer's ear in cases where temperature measurements alone may not provide reliable information for assessing device fit.

Figure 3:
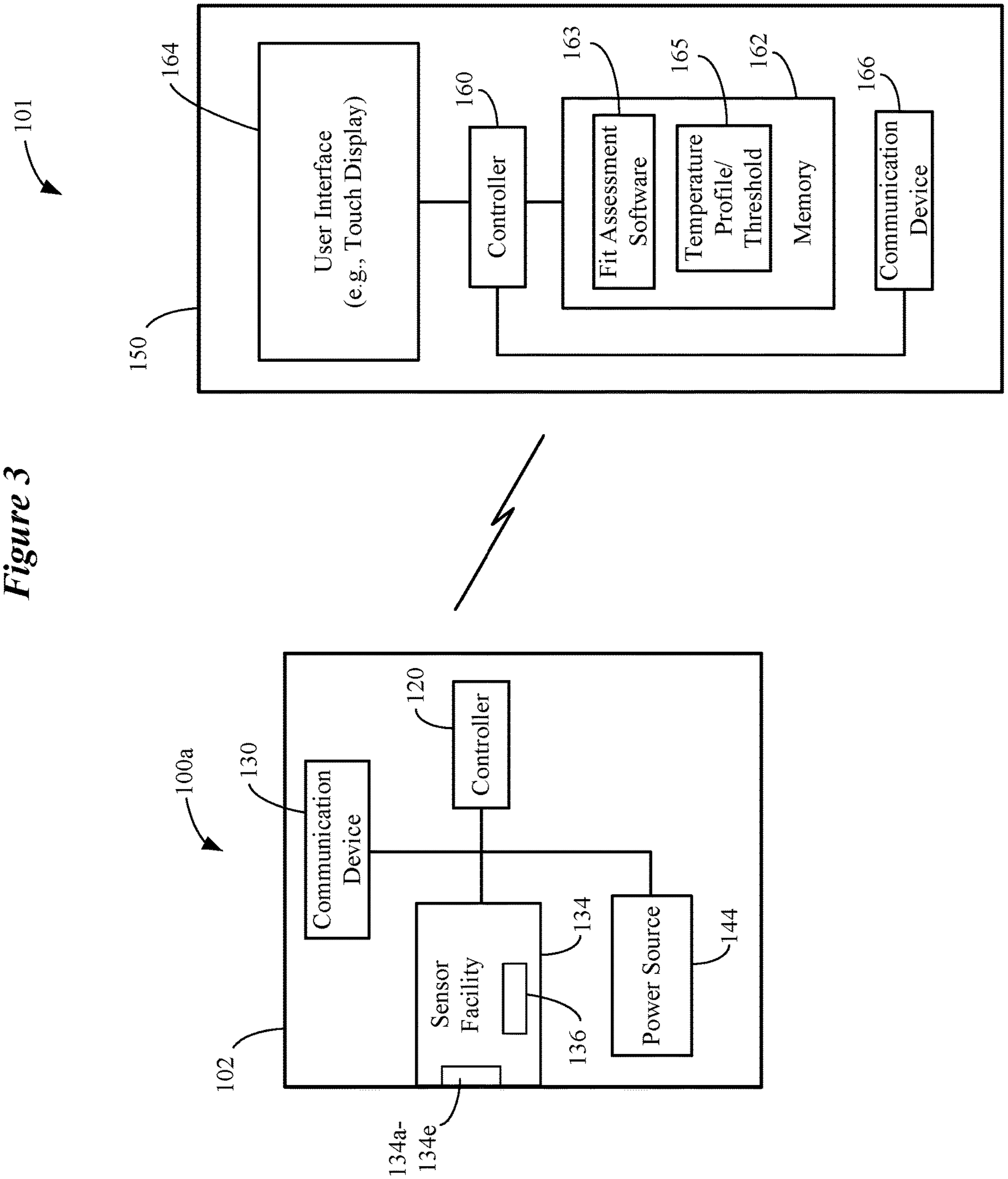
FIG. 3 illustrates a system comprising an ear-worn electronic device and an external electronic device configured to communicatively couple to the ear-worn electronic device in accordance with any of the embodiments disclosed herein.

FIG. 3 illustrates a system 101 in accordance with any of the embodiments disclosed herein. The system 101 comprises an ear-worn electronic device 100*a* and an external electronic device 150 configured to communicatively couple to the ear-worn electronic device 100*a*. The ear-worn electronic device 100*a* includes a housing 102 configured for deployment in, on or about an ear of a wearer as previously described. The housing 102 is configured to contain or support a number of components including a sensor facility 134 comprising one or more temperature sensors 134*a* and, in some implementations, one or more auxiliary sensors 134*b*-134*e* as previously described. The sensor facility 134 can include or be coupled to signal processing circuitry 136 configured to process sensor signals prior to communication of the sensor signals to a controller 120 coupled to a memory 122. The controller 120 is configured to control operation of the various components of the device 100*a* and is coupled to a communication device 130.

The communication device 130 can include a radiofrequency (RF) transceiver and antenna and/or a near field magnetic induction (NFMI) transceiver and antenna. For example, the communication device 130 can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4.2, 5.0, 5.1, 5.2 or later) specification, for example. Sensor signals generated by the sensor facility 134 can be communicated to the external electronic device 150 via the communication device 130.

The external electronic device 150 includes a communication device 166 configured to communicatively coupled to the communication device 130 of the ear-worn electronic device 100*a*. The external electronic device 150 includes a controller 160 coupled to memory 162 and a user interface 164. The user interface 164 can include a touch display and an audio processing facility (e.g., a speaker and optionally a microphone), for example. The memory 162 is configured to store fit assessment software 163, which includes program instructions executable by the controller 160. In some embodiments, a predetermined temperature profile, template, pattern or threshold 165 is stored in the memory 162 and used by the controller 160 as part of a device fit assessment procedure. The predetermined temperature profile, template, pattern or threshold 165 stored in the memory 162 can be obtained by the external electronic device 150 from a memory (e.g., ROM or EEPROM) of the ear-worn electronic device 100*a* or from a server of the device manufacturer or a technical specialist (e.g., audiologist). As described hereinabove, the controller 160 of the external electronic device 150 is configured to assess the fit of the device 100*a* in, on or about the wearer's ear using sensor signals produced by the sensor facility 134 of the ear-worn electronic device 100*a*. The controller 160 can generate an output indicative of the device fit assessment (e.g., an output indicating a good fit or a poor fit). The output produced by the controller 160 can include an audible output, a visual output, a tactile output, or combination of any of these outputs.

Figure 4:
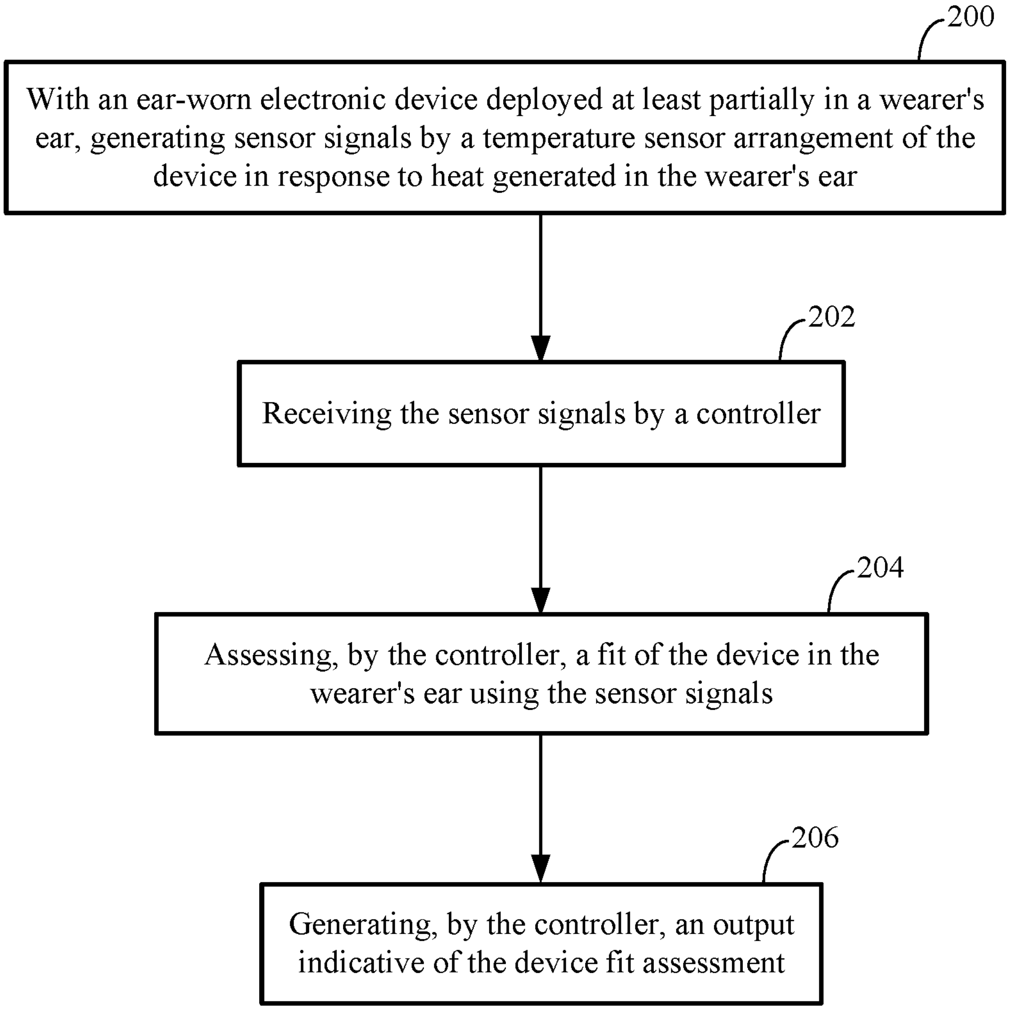
FIG. 4 is a flow diagram of a method for assessing the fit of an ear-worn electronic device in a wearer's ear in accordance with any of the embodiments disclosed herein.

FIG. 4 is a flow diagram of a method for assessing the fit of an ear-worn electronic device in a wearer's ear in accordance with any of the embodiments disclosed herein. For example, the method shown in FIG. 4 can be implemented by any of the devices shown in FIGS. 1-3, 5-6, and 10-12. According to FIG. 4, and with the ear-worn electronic device deployed at least partially in a wearer's ear, the method comprises generating 200 sensor signals by a temperature sensor arrangement of the device in response to heat generated in the wearer's ear. The method comprises receiving 202 the sensor signals by a controller. The controller can be a component of the ear-worn electronic device, a component of an external electronic device communicatively coupled to the ear-worn electronic device, or controllers of the ear-worn and external electronic devices operatively coupled to one another. The method also comprises assessing 204, by the controller, a fit of the device in the wearer's ear using the sensor signals. The method further comprises generating 206, by the controller, an output indicative of the device fit assessment. The output can be an audio output and/or a tactile output produced by the ear-worn electronic device and/or the external electronic device. In addition, or alternatively, the output can be a visual output produced by the external electronic device.

In various embodiments, the method shown in FIG. 4 can comprise detecting a trigger event by the controller, and initiating device fit assessment by the controller in response to the trigger event. The trigger event can comprise a change in temperature measured by the temperature sensor arrangement relative to a threshold. The trigger event can comprise a rate of change in temperature measured by the temperature sensor arrangement relative to a threshold. In some embodiments, the device comprises an auxiliary sensor configured to generate auxiliary sensor signals, and the trigger event is detected by the controller in response to the temperature sensor signals and the auxiliary sensor signals.

FIG. 5A illustrates an ear-worn electronic device 100*b* in accordance with any of the embodiments disclosed herein. The device 100*b* shown in FIG. 5A is configured as an earbud, it being understood that the device 100*b* can be representative of other types of in-ear electronic devices. The device 100*b* includes a housing 102 configured for deployment in an ear of a wearer. The device 100*b* can be deployed as a single-ear device or two devices 100*b* can be deployed as a dual-ear device system. The housing 102 includes a body 102*a*, a shaft 102*b* extending from the body 102*a*, and a cap 102*c* affixed to the shaft 102*b*. The cap 102*c* can be a detachable ear tip or a permanently affixed ear tip. The cap 102*c* is designed to provide a cushion layer for the earbud 100*b* to fit into the wearer's ear canal with comfort. The cap 102*c* can include a one or more U-shaped soft silicon layers with an interior layer or surface configured to snap or otherwise affix to the shaft 102*b*. The exterior layer or surface of the cap 102*c* is shaped to fit in the ear canal.

The fit of the cap 102*c* within the ear canal can be a sealed fit or a non-sealed (e.g., vented) fit. In accordance with embodiments that include an audio processing facility, the cap 102*c* includes a bore 103 through which sound generated by components housed in the body 102*a* can be communicated to a wearer's ear drum (tympanic membrane). In accordance with embodiments that exclude an audio processing facility, the cap 102*c* can be substantially solid.

Figure 12:
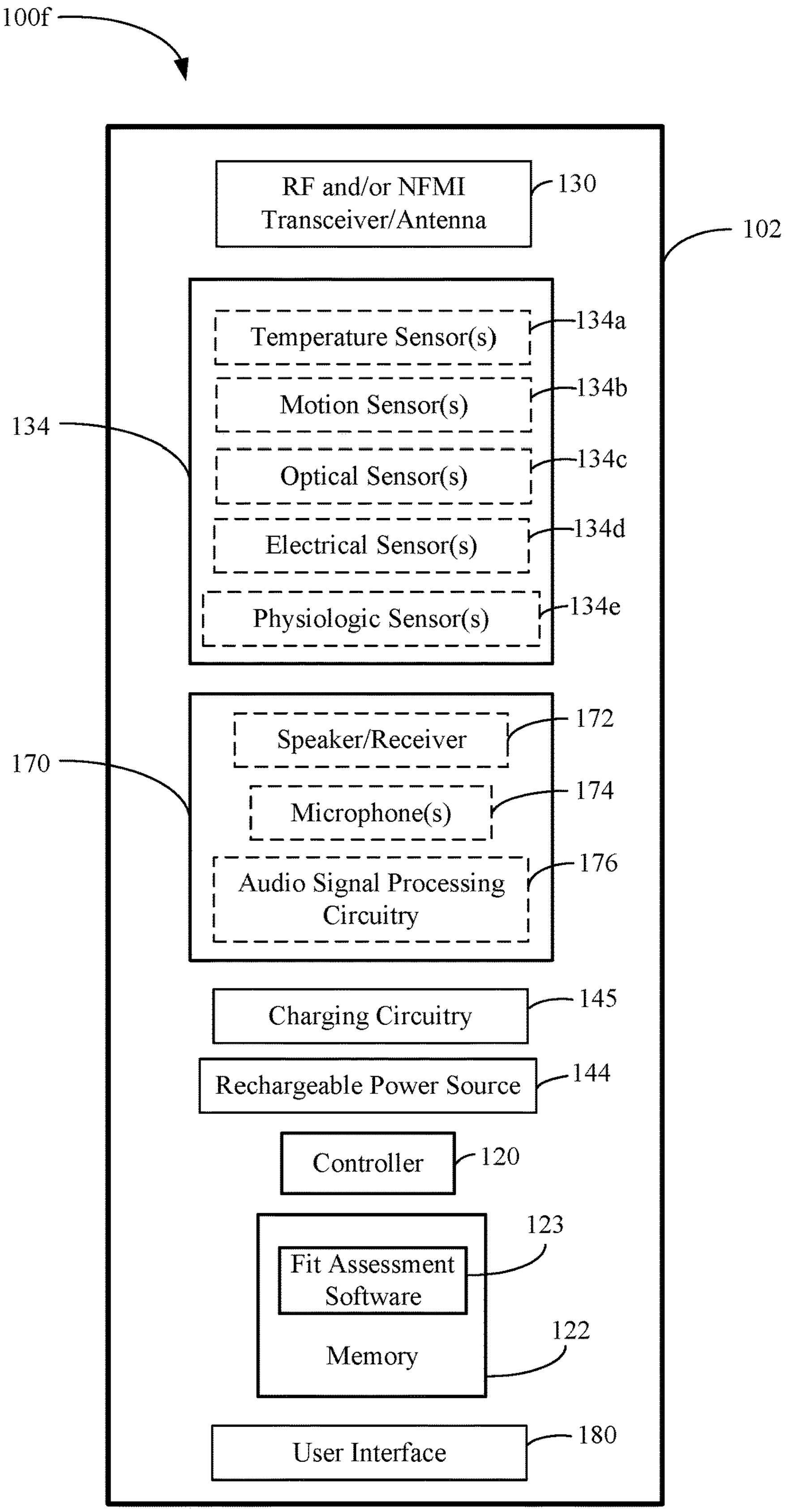
FIG. 12 is a block diagram of an ear-worn electronic device configured to implement a sensor-based device fit assessment in of accordance with any of the embodiments disclosed herein.

The body 102*a* of the housing 102 is configured to contain or support a number of components including a sensor facility 134 comprising at least one or more temperature sensors 134*a* as previously described. The sensor facility 134 can include or be coupled to signal processing circuitry 136 configured to process sensor signals prior to communication of the sensor signals to a controller 120 coupled to a memory 122. The memory 122 is configured to store fit assessment software which includes program instructions executable by the controller 120. The controller 120 is configured to execute fit assessment program instructions 123 to assess the fit of the device 100 in the wearer's ear using the sensor signals produced by the sensor facility 134. A predetermined temperature profile, template, pattern or threshold 125 can be stored in the memory 122 and used by the controller 120 as part of a device fit assessment procedure in some embodiments. A power source 144, such as a rechargeable battery and charging circuitry, is configured to provide power to various components of the device 100*b*. One or more other components 127 (e.g., RF and/or NFMI transceiver) can be disposed in the body 102*a* and/or other portions of the housing 102 (e.g., shaft 102*b*), representative examples of which are shown in FIG. 12.

The sensor facility 134 shown in FIG. 5A includes two temperature sensors 134*a* mounted in or on the cap 102*c* of the earbud 100*b*. The temperature sensors 134*a* can be thermistors or any other type of thermal sensor described herein or commercially available. The temperature sensors 134*a* are preferably situated at different (e.g., opposing) locations of the cap 102*c*. For example, the temperature sensors 134*a* can be spaced apart radially from one another, such as from about 90 to 180 degrees from one another. Additionally, the temperature sensors 134*a* can be spaced apart axially from one another, such as from about 1 mm to 8 mm. For example, one temperature sensor 134*a* can be disposed on the cap 102*c* biased toward the wearer's ear drum, and another temperature sensor 134*a* can be disposed on the cap 102*c* and biased toward an outer ear of the wearer. Although two temperature sensors 134*a* are shown mounted in or on the cap 102*c* in FIG. 5A, it is understood that one, two, three, four or more temperature sensors 134*a* can be deployed on the cap 102*c* and/or other portions of the housing 102 (e.g., shaft 102*b*, body 102*a*).

FIG. 5B illustrates an ear-worn electronic device 100*b*-1 in accordance with any of the embodiments disclosed herein. The device 100*b*-1 shown in FIG. 5B is configured as a standard-shaped consumer earbud. The device 100*b*-1 includes a housing 102 configured for deployment in an ear of a wearer. The device 100*b*-1 can be deployed as a single-ear device or two devices 100*b*-1 can be deployed as a dual-ear device system. The housing 102 includes a body 102*a*, a shaft (not shown, but see FIG. 5A) extending from the body 102*a*, and a cap 102*c* affixed to the shaft. The cap 102*c* can be a detachable ear tip or a permanently affixed ear tip.

The cap 102*c* is designed to provide a cushion layer for the earbud 100*b*-1, and can include a one or more U- or bowl-shaped soft silicon layers with an interior layer or surface configured to snap or otherwise affix to the shaft. The exterior layer or surface of the cap 102*c* has a standard shape to fit in the ear canal of the vast majority of consumers. The cap 102*c* can also be formed from a soft or pliant material, such as a foam, memory foam or sponge material, and have a standard shape to fit in the ear canal of the vast majority of consumers. The fit of the cap 102*c* within the ear canal can be a sealed fit or a non-sealed (e.g., vented) fit. In accordance with embodiments that include an audio processing facility, the cap 102*c* includes a bore (not shown, but see FIG. 5A) through which sound generated by components housed in the body 102*a* can be communicated to a wearer's ear drum. In accordance with embodiments that exclude an audio processing facility, the cap 102*c* can be substantially solid.

The body 102*a* of the housing 102 is configured to contain or support a number of components including a sensor facility comprising at least one or more temperature sensors as previously described with reference to FIG. 5A and elsewhere. The body 102*a* of the housing 102 can be configured to contain or support additional components, including any of those shown in FIG. 5A. These components can be configured to assess the fit of the device 100*b*-1 in the wearer's ear in a manner previously described (see, e.g., FIG. 5A). In some configurations, the standard-shaped consumer earbud 100*b*-1 shown in FIG. 5B can be implemented as a wireless earbud (typically implemented as a pair of wireless earbuds). In other configurations, the standard-shaped consumer earbud 100*b*-1 shown in FIG. 5B can be implemented as a wired earbud (typically implemented as a pair of wired earbuds). In either wired or wireless embodiments, various components shown in the body 102*a* of the device 100*b* shown in FIG. 5A and/or associated functionality of such components can be implemented by components of the electronic device to which the standard-shaped consumer earbud(s) 100*b*, 100*b*-1 are attached (e.g., processor and/or memory of a smartphone or tablet executing a fit assessment app).

FIG. 6 shows a representative ear-worn electronic device 100*c* positioned in a wearer's ear canal 22 in accordance with any of the embodiments disclosed herein. The ear-worn device 100*c* is configured as a CIC device comprising a housing 322. The housing 322 is configured contain or support any combination of the components shown in FIGS. 1-3, 5, and 12. The housing 322 is configured for insertion into the ear canal 22 and includes a distal end 324 and a proximal end 326. The terminus of the distal end 324 includes a tip 325, and a terminus of the proximal end 326 includes a faceplate 328. The distal end 324 is configured to extend beyond the second bend 26 of the ear canal 22, with a tip 325 of the distal end 324 terminating prior to the ear drum. The faceplate 328 typically terminates exterior of the first bend 24 and interior of the aperture of the ear canal 22.

One, two, three, four or more temperature sensors 134*a* are situated on or in the housing 322. Three temperature sensors 134*a* are shown in FIG. 6 for illustrative purposes. Temperature sensors 134*a* can be spaced apart radially and/or axially from one another as previously described. For example, a distal temperature sensor 134*a* is shown situated at a location of the housing 322 that can measure the temperature of ear canal tissue at or immediately adjacent Location 2. A proximal temperature sensor or sensors 134*a* can be situated in or on the housing 322 proximal of the distal temperature sensor 134*a* in an outer ear direction. For example, a proximal temperature sensor 134*a* can be situated in or on the housing 322 proximate the faceplate 328 or a location between the faceplate 328 and the distal temperature sensor 134*a* situated at Location 2. Temperature sensors 134*a* can be situated in or on the housing 322 at locations designed to form a sealed fit within the ear canal, at non-sealed fit locations, or a combination of sealed and non-sealed fit locations of the housing 322.

It is noted that Location 2 is a location of the ear canal 22 between the first and second bends 24, 26 that is close (e.g., nearest) to the superficial temporal artery branch of the external carotid artery. Location 2 is considered the warmest region in the ear canal 22 that is adjacent to areas reachable from the surface of an in-the-canal device. Location 2 is located on the ventral side of the ear canal 22 just past the first bend 24 and before the second bend 26. More particularly, Location 2 is interior to the tragus "flat" area, interior to the first bend 24, and exterior to the second bend 26 on the ventral side of the ear canal 22.

After deploying (e.g., inserting) the device 100*b*, 100*c* in the wearer's ear, the controller 120 is configured to implement a device fit assessment procedure. In some implementations, instructions for participating in the device fit assessment procedure can be communicated to the wearer, such as audibly if the device 100*b*, 100*c* is equipped with an audio output device and/or visually via a smartphone or other electronic device communicatively coupled to the ear-worn electronic device 100*b*, 100*c*. During the device fit assessment procedure implemented by the controller 120, the sensor facility 134 actively senses temperature in the wearer's ear and generates sensor signals in response to heat generated in the wearer's ear. In some implementations, one or more auxiliary sensors of the sensor facility 134 (see, e.g., the sensors shown in FIG. 2) can be active and produce additional sensor signals used by the controller 120 in connection with the device fit assessment. The controller 120 is configured to assess the fit of the device 100*b*, 100*c* using sensor signals received from the sensor facility 134 in a manner previously described. The controller 120 can be configured to detect whether the fit of the device 100*b*, 100*c* is a proper fit or an improper fit using the sensor signals. The controller 120 can generate an output indicative of the device fit assessment (e.g., an output indicating a good fit or a poor fit).

Figure 7:
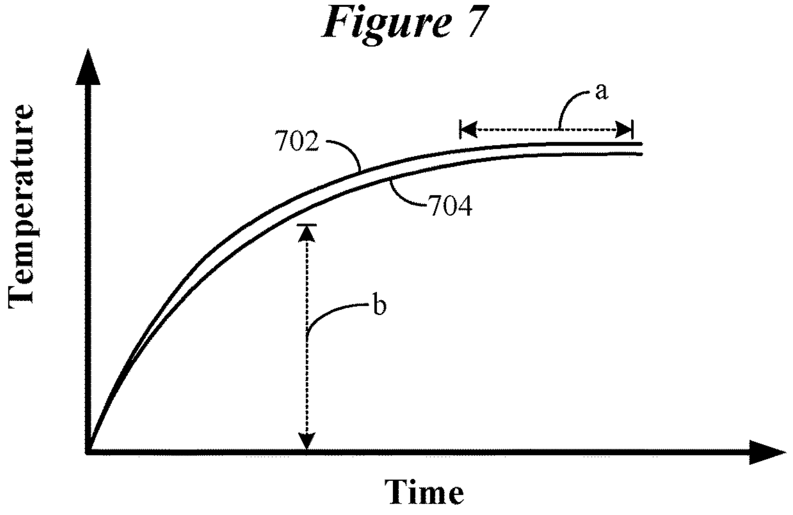
FIG. 7 shows profiles of two temperature sensors of an ear-worn electronic device indicative of a good fit of the device.
Figure 8:
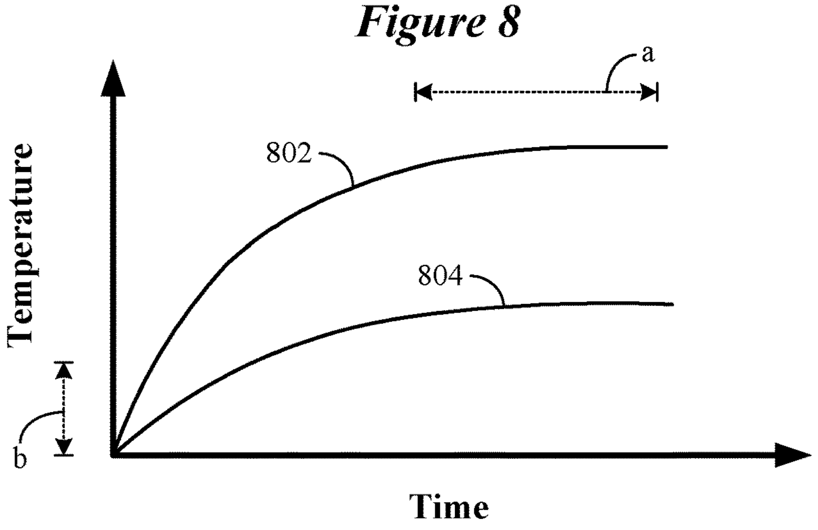
FIG. 8 shows profiles of two temperature sensors of an ear-worn electronic device indicative of a poor fit of the device.

FIG. 7 shows profiles 702, 704 of two temperature sensors of an ear-worn electronic device of a first design indicative of a particular fit of the device in, on or about a wearer's ear. FIG. 8 shows profiles 802, 804 of two temperature sensors of an ear-worn electronic device of a second design indicative of a particular fit of the device in, on or about a wearer's ear. The profiles 702/704 and 802/804 shown in FIGS. 7 and 8 represent time-varying characterizations of temperature within the wearer's ears using sensor signals received from a sensor facility 134 comprising two temperature sensors 134*a*.

In some embodiments, the profiles 702/704 and 802/804 are generated by a controller 120 of the ear-worn electronic device 100*a*-100*f*. In other embodiments, temperature sensor signals generated by a sensor facility 134 of an ear-worn electronic device 100*a*-100*f* are communicated to an external electronic device (e.g., a smartphone or tablet), and a controller of the external electronic device generates the profiles 702/704 and 802/804 using the received sensor signals. A controller 120 of the ear-worn electronic device 100*a*-100*f* or the controller of an external electronic device assesses the fit of the ear-worn device 100*a*-100*f* using the profiles 702/704 and 802/804. A result of the device fit assessment can be communicated to the wearer via an audio processing facility of the ear-worn electronic device 100*a*-100*f* and/or an audio and/or visual interface of the external electronic device.

In the following discussion directed to FIGS. 7 and 8, a controller 120 of an ear-worn electronic device 100*a*-100*f* is described as performing various processes for assessing the fit of the device 100*a*-100*f* within the wearer's ear. It is understood that these processes can be performed by a controller of an external electronic device or via cooperation between controllers of an ear-worn electronic device and an external electronic device. According to various embodiments, the controller 120 is configured to generate time-varying characterizations 702/704 and 802/804 of temperature within the wearer's ear using sensor signals produced by the sensor facility 134. The controller 120 is configured to measure differences between the temperature characterizations 702/704 and 802/804. The controller 120 is configured to assess the fit of the device 100*a*-100*f* using the temperature characterization differences.

In general, the profile of one or more temperature sensors indicative of a proper fit varies from one ear-worn electronic device design to another. For some device designs, a relatively small separation between temperature characterizations or profiles (e.g., temperature profiles 702/704) produced from signals generated by the two closely spaced temperature sensors can be indicative of a good fit. For other device designs, a relatively small separation between temperature profiles (e.g., temperature profiles 702/704) produced from signals generated by the two closely spaced temperature sensors can be indicative of a poor fit.

For some device designs, a relatively large separation between temperature profiles (e.g., temperature profiles 802/804) produced from signals generated by the two distantly spaced temperature sensors can be indicative of a good fit. For other device designs, a relatively large separation between temperature profiles (e.g., temperature profiles 802/804) produced from signals generated by the two distantly spaced temperature sensors can be indicative of a poor fit.

By way of example, a first device design can include two temperature sensors with a small separation therebetween. The controller 120 can identify a relatively small separation between temperature profiles (e.g., temperature profiles 702/704) produced from signals generated by the two closely spaced temperature sensors. The pattern of closely separated temperature profiles identified by the controller 120 for the first device design may be indicative of a good fit or a poor fit relative to predetermined temperature profile pattern developed for the first device design.

For example, the controller 120 can compare the pattern of closely separated temperature profiles 702, 704 shown in FIG. 7 to a predetermined temperature profile pattern developed for the first device design. If the comparison results in a sufficiently close match (e.g., relative to a matching threshold or a matching template), the controller 120 determines that the present fit of the first device in a wearer's ear is a good fit. If the comparison results in a non-matching condition (e.g., relative to the matching threshold or the matching template), the controller 120 determines that the present fit of the first device in the wearer's ear is a poor fit.

By way of further example, a second device design can include two temperature sensors having a large spatial separation therebetween. The controller 120 can identify a relatively large separation between temperature profiles (e.g., temperature profiles 802/804) produced from signals generated by the two distantly spaced temperature sensors. The pattern of largely separated temperature profiles identified by the controller 120 for the second device design may be indicative of a good fit or a poor fit relative to a predetermined temperature profile pattern developed for the second device design.

For example, the controller 120 can compare the pattern of largely separated temperature profiles 802, 804 shown in FIG. 8 to a predetermined temperature profile pattern developed for the second device design. If the comparison results in a sufficiently close match (e.g., relative to a matching threshold or a matching template), the controller 120 determines that the present fit of the second device in a wearer's ear is a good fit. If the comparison results in a non-matching condition (e.g., relative to the matching threshold or the matching template), the controller 120 determines that the present fit of the second device in the wearer's ear is a poor fit.

According to another illustrative example, the controller 120 can generate the temperature profiles 702/704 having a relatively small separation therebetween (e.g., due to the device design having two closely spaced temperature sensors). In addition to assessing the relative spacing between the two temperature profiles 702/704, the controller 120 can also determine whether or not both temperature profiles have reached a predetermined threshold (e.g., indicating that both temperature sensors are touching the skin surface and further in the ear canal). In this illustrative example, a good fit can be determined by the controller 120 based on the relative spatial separation between the temperature profiles 702/704 and a determination that both temperature profiles reached a predetermined threshold.

By way of further example, the magnitude of measured temperature as a function of time for curves 702 and 704 can be compared by the controller 120, and a temperature difference between the two curves 702, 704 as a function of time can be measured. Differences in the magnitude between the two curves 702, 704 as a function of time (e.g., magnitude differences at times $t_1$, $t_2$ . . . $t_n$) can be compared to a threshold. The threshold is typically specific to a particular type of ear-worn electronic device (e.g., in-canal vs. earbud vs. ITE) and therefore typically differs across disparate types of ear-worn electronic devices. Generally, a typical threshold is a temperature difference of less than about 1.2° C. (e.g., any value from about 0.1° C. to about 1° C., such as from about 0.1° C. to about 0.8° C. or from about 0.1° C. to about 0.4° C.). For example, the threshold can be 0.1° C., 0.2° C., 0.3° C. or 0.4° C. for a RIC-type device or an earbud. For an in-canal type device (e.g., a custom device such as a CIC-type device), the threshold can be any value from about 0.2° C. to about 1.2° C., such as about 0.2° C. to about 0.8° C. or about 0.2° C. to about 0.6° C.

If the measured differences between curves 702 and 704 as a function of time are below the threshold, the controller 120 assesses the device fit as a good fit. For example, and with reference to FIG. 7, the two curves 702, 704 are similar in terms of magnitude as a function of time, and the measured differences in magnitude as a function of time are less than the threshold (e.g., <~0.2° C.). As such, the controller 120 determines that the fit of the device 100*a*-100*f* is a good fit using measurements performed on curves 702 and 704.

Referring now to FIG. 8, the magnitude of the measured temperature as a function of time for curves 802 and 804 is compared by the controller 120, and a temperature difference between the two curves 802, 804 as a function of time is measured. Differences in the magnitude between the two curves 802, 804 as a function of time are compared to a threshold. In the representative example shown in FIG. 8, the measured differences between curves 802 and 804 exceed the threshold (e.g., >>~0.2° C.). As a result, the controller 120 indicates that the device fit is poor.

The controller 120 can be configured to assess the fit of an ear-worn electronic device 100*b*, 100*c* using a temperature gradient (e.g., temperature curve slope or rate of temperature change) generated by the controller 120 using sensor signals produced by the sensor facility 134. For example, the controller 120 can be configured to generate a temperature gradient using sensor signals produced by the sensor facility 134, compare the temperature gradient to a threshold, and assess the fit of the device 100*b*, 100*c* using a result of the comparison. In the case of two temperature sensors, the controller 120 is configured to generate a temperature gradient using sensor signals produced by the two temperature sensors, compare the temperature gradient to a threshold, and assess the fit of the device using a result of the comparison. In the case of three or more temperature sensors, the controller 120 is configured to generate a plurality of temperature gradients using the temperature signals produced by respective pairs or combinations of the or more temperature sensors, compare the temperature gradients to at least one threshold, and assess the fit of the device 100*b*, 100*c* using a result of the comparison. The threshold can be a pre-established slope or rate of temperature change threshold appropriate for the particular device 100*b*, 100*c*.

According to some implementations, a pre-established temperature profile can be determined for a particular device 100*b*, 100*c* (e.g., a device-specific profile). In other implementations, a pre-established temperature profile can be determined for a particular device 100*b*, 100*c* and a particular wearer of the device 100*b*, 100*c* (e.g., a device- and wearer-specific profile). The pre-established temperature profile can be generated by the device manufacturer and/or a technical specialist (e.g., an audiologist). The pre-established temperature profile can be adjusted over time to account for changes in device performance/components and/or wearer usage (typically performed by a technical specialist). In such implementations, the controller 120 is configured to generate a temperature profile using sensor signals generated by the sensor facility 134, compare the temperature profile to a temperature profile pre-established for the device or the device and the wearer, and assess the fit of the device 100*b*, 100*c* using a result of the comparison. The pre-established temperature profile can be a time-varying temperature profile (e.g., a temperature curve) or a temperature gradient developed for a particular device or a particular device and wearer.

As is shown in FIGS. 7 and 8, each of the temperature curves 702, 704, 802, 804 has a steady-state region, a, and a dynamic region, b. The controller 120 can be configured to assess the fit of an ear-worn electronic device 100*b*, 100*c* using temperature information specific to the steady-state region a, the dynamic region b, or both the steady-state region a and the dynamic region b. For example, the controller 120 can generate a temperature profile or gradient using sensor signal data for the steady-state region a alone, the dynamic region b alone, or both the steady-state region a and the dynamic region b. This temperature profile or gradient can be compared to a threshold, and the controller 120 can assess the fit of the device 100*b*, 100*c* using a result of the comparison as previously described.

Figure 9:
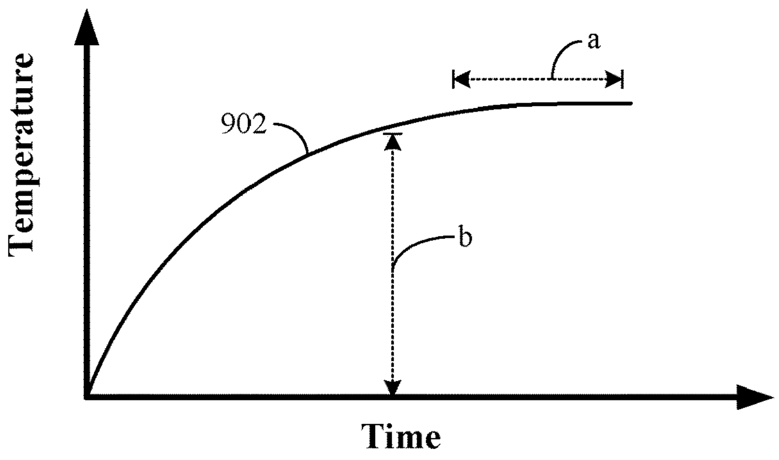
FIG. 9 shows a profile of a single temperature sensor of an ear-worn electronic device that can be used to assess the fit of the device in accordance with any of the embodiments disclosed herein.

FIG. 9 shows a profile 902 generated by the controller 120 using sensor signals produced by a single temperature sensor of an ear-worn electronic device. In accordance with some implementations, sensor signals produced by a single temperature sensor can be used by the controller 120 to generate a time-varying characterization (e.g., temperature curve

902), temperature profile or temperature gradient. The controller 120 can be configured to compare the time-varying characterization, temperature profile or temperature gradient to a threshold, and assess the device fit using a result of the comparison as previously described. The device fit assessment can be performed by the controller 120 using sensor signal data for the steady-state region a alone, the dynamic region b alone, or both the steady-state region a and the dynamic region b as previously described. Although a single temperature sensor can be used to assess the fit of an ear-worn electronic device 100*b*, 100*c* using techniques disclosed herein, it is believed that the use of multiple temperature sensors provides for a more robust device fit assessment system.

Various aspects of one or more temperature characterizations or profiles can be evaluated the controller 120 or a controller of an external electronic device to assess the fit of a particular ear-worn electronic device in a wearer's ear. These aspects can include one or any combination of the shape or morphology of the temperature profile, the magnitude of the temperature profile, and the rate of change (e.g., a first or second time derivative) of the temperature profile.

Various aspects of a difference between two or more temperature profiles can be evaluated by the controller 120 or a controller of an external electronic device to assess the fit of a particular ear-worn electronic device in a wearer's ear. These aspects can include one or any combination of a difference in the shape or morphology of two or more temperature profiles, a difference in the magnitude of two or more temperature profiles, a difference in the rate of change (e.g., a first or second time derivative) of two or more temperature profiles, and spacing between two or more temperature profiles.

Any one or combination of these aspects can be compared against a predetermined threshold (or template) or a predetermined combination of thresholds (or templates). Various comparison measures can be implemented by the controller 120 or a controller of an external electronic device, in including one or more statistical measures (e.g., correlation, cross-correlation, standard deviation). For example one or more temperature profile patterns can be compared to one or more predetermined temperature profile patterns using a feature correlation-based measure (e.g., feature coefficient-based matching relative to a matching threshold such as >90% or >95%).

Figure 10:
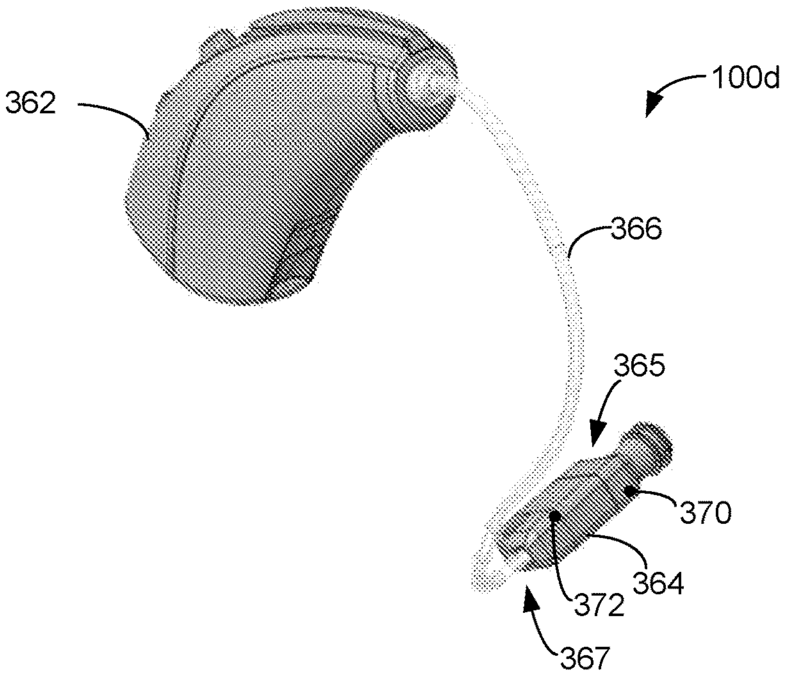
FIG. 10 shows a representative ear-worn device configured to perform a temperature sensor-based device fit assessment in accordance with any of the embodiments disclosed herein.
Figure 11:
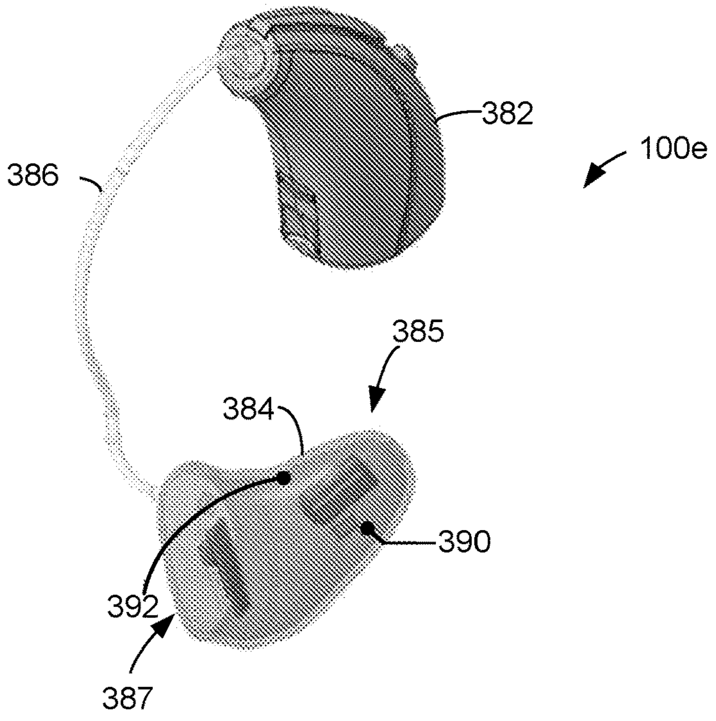
FIG. 11 shows a representative ear-worn device configured to perform a temperature sensor-based device fit assessment in accordance with any of the embodiments disclosed herein.

FIGS. 10 and 11 show representative ear-worn devices configured to perform a temperature sensor-based device fit assessment in accordance with any of the embodiments disclosed herein. The ear-worn devices 100*d*, 100*e* are configured as RIC devices. The ear-worn device 100*d* is representative of a standard RIC implementation, which includes a standard receiver 364 coupled to a case 362 via a cable 366. The ear-worn device 100*e* is representative of a custom RIC implementation, which includes a custom receiver 384 (molded to the wearer's ear canal) coupled to a case 382 via a cable 386. The case 362, 382 is configured for positioning behind the ear of the wearer, and the receiver 364, 384 is configured for positioning in the ear canal. The receiver 364, 384 includes a loudspeaker, while other electronics are housed in the case 362, 382.

The receiver 364, 384 includes an enclosure configured for insertion into the ear canal and includes a distal end 365, 385 and a proximal end 367, 387. The distal end 365, 385 is configured to extend beyond the first bend, and typically terminates prior to the second bend. A distal temperature sensor 370, 390 is situated at a location of the receiver 364, 384 (e.g., a forward location) that can measure the temperature of ear canal tissue at a location biased towards the ear drum (e.g., a forward location, such as at or immediately adjacent Location 2 previously described). A proximal temperature sensor 372, 392 is situated at a location of the receiver 364, 384 proximal of the distal temperature sensor 370, 390 in an outer ear direction (e.g., a rearward location). For example, the proximal temperature sensor 372, 392 can be situated near the rear housing surface of the receiver 364, 384 proximate the cable 366, 386. The ear-worn devices 100*d*, 100*e* shown in FIGS. 10 and 11 can include any combination of components shown in FIGS. 1-3, 5-6, and 12. The ear-worn devices 100*d*, 100*e* shown in FIGS. 10 and 11 can be implemented to perform any of the processes described herein, including interactions with an external electronic device (see, e.g., FIG. 3).

FIG. 12 is a block diagram of an ear-worn electronic device 100*f* configured to implement a sensor-based device fit assessment in of accordance with any of the embodiments disclosed herein. As was previously discussed, the device 100*f* is representative of a wide variety of electronic devices configured to be deployed in, on or about an ear of a wearer. The device 100*f* shown in FIG. 12 includes the core components shown in FIGS. 1 and 3, including a controller 120 coupled to memory 122 configured to store fit assessment software 123, a sensor facility 134, and a power source 144. In implementations that include a rechargeable power source 144, the device 100*f* includes charging circuitry 145 coupled to the rechargeable power source 144. The charging circuitry 145 is configured to cooperate with an external charging module to facilitate charging of the rechargeable power source 144. As was previously discussed, the sensor facility 134 can include one or more temperature sensors 134*a* and any one or any combination of one or more motion sensors 134*b*, one or more optical sensors 134*c*, one or more electrical sensors 134*d*, and one or more physiologic sensors 134*e*.

In some embodiments, the device 100*f* incorporates an audio processing facility 170. The audio processing facility 170 includes audio signal processing circuitry 176 coupled to a speaker or receiver 172. The audio processing facility 170 may also include one or more microphones 174 coupled to the audio signal processing circuitry 176. In other embodiments, the device 100*f* is devoid of the audio processing facility 170. The device 100*f* can also incorporate a communication facility 130 configured to effect communications with an external electronic device, system and/or the cloud. The communication facility 130 can include one or both of an RF transceiver/antenna and/or an NFMI transceiver/antenna.

According to embodiments that incorporate the audio processing facility 170, the device 100*f* can be implemented as a hearing assistance device that can aid a person with impaired hearing. For example, the device 100*f* can be implemented as a monaural hearing aid or a pair of devices 100*f* can be implemented as a binaural hearing aid system. The monaural device 100*f* or a pair of devices 100*f* can be configured to effect bi-directional communication (e.g., wireless communication) of data with an external source, such as a remote server via the Internet or other communication infrastructure. The device or devices 100*f* can be configured to receive streaming audio (e.g., digital audio data or files) from an electronic or digital source. Representative electronic/digital sources (e.g., accessory devices) include an assistive listening system, a streaming device (e.g., a TV streamer or audio streamer), a radio, a smartphone, a laptop, a cell phone/entertainment device (CPED)

or other electronic device that serves as a source of digital audio data, control and/or settings data or commands, and/or other types of data files.

The device 100f can also include a user interface 180, which can include manually-actuatable buttons and/or switches (e.g., mechanical, capacitive, and/or optical switches). The user interface 180 may alternatively, or additionally, include a voice recognition interface configured to facilitate wearer control of the device 100f via voice commands. The voice recognition interface is preferably configured to discriminate between vocal sounds produced from the wearer of the device 100f (e.g., "own voice" recognition via an acoustic template developed for the wearer) and vocal sounds produced from other persons in the vicinity of the device 100f. The user interface 180 may alternatively, or additionally, include a gesture detection interface configured to facilitate wearer control of the device 100f via gestures (e.g., non-contacting hand and/or finger gestures made in proximity to the device 100f). Examples of gesture detection user interfaces and voice recognition user interfaces suitable for incorporation in device 100f are disclosed in U.S. Patent Application Nos. 62/875,139 filed Jul. 17, 2019 and entitled "Ear-Worn Electronic Device Incorporating Gesture Control System Using Frequency-Hopping Spread Spectrum Transmission" and 62/939,031 filed Nov. 22, 2019 and entitled "Ear-Worn Electronic Device Incorporating Gesture Control System Using Frequency-Hopping Spread Spectrum Transmission," U.S. Pat. Nos. 8,165,329, 9,900,712, and 10,341,784, and U.S. Patent Publication Nos. 2010/0067722, 2011/0238419, and 2011/0261983, each of which is incorporated herein by reference in its entirety.

The controller 120 (and the controller 120 shown in other figures) can include one or more processors or other logic devices. For example, the controller 120 can be representative of any combination of one or more logic devices (e.g., multi-core processor, digital signal processor (DSP), microprocessor, programmable controller, general-purpose processor, special-purpose processor, hardware controller, software controller, a combined hardware and software device) and/or other digital logic circuitry (e.g., ASICs, FPGAs), and software/firmware configured to implement the functionality disclosed herein. The controller 120 can incorporate or be coupled to various analog components (e.g., analog front-end), ADC and DAC components, and Filters (e.g., FIR filter, Kalman filter). The memory 122 can include one or more types of memory, including ROM, RAM, SDRAM, NVRAM, EEPROM, and FLASH, for example. The controller 120 can be coupled to, or incorporate, the memory 122.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure.

Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-worn electronic device, comprising:
- a housing configured to fit at least partially in an ear of a wearer;
- a power source situated in the housing;
- a temperature sensor arrangement situated in or on the housing and coupled to the power source, the temperature sensor arrangement comprising one or more temperature sensors configured to generate sensor signals in response to heat generated in the wearer's ear; and
- a controller situated in the housing and coupled to the power source and the temperature sensor arrangement, the controller configured to assess a fit of the device within the wearer's ear using the sensor signals.

2. The device according to claim 1, wherein the controller is configured to detect whether the fit of the device is a proper fit or an improper fit using the sensor signals.

3. The device according to claim 1, wherein the controller is configured to:
- generate a time-varying characterization of temperature within the wearer's ear using the sensor signals; and
- assess the fit of the device using the temperature characterization.

4. The device according to claim 1, wherein the controller is configured to:
- generate a plurality of time-varying characterizations of temperature within the wearer's ear using sensor signals produced by each of the temperature sensors;
- measure differences between the temperature characterizations; and
- assess the fit of the device using the temperature characterization differences.

5. The device according to claim 1, wherein the controller is configured to:
- generate a temperature profile using the sensor signals;
- compare the temperature profile to a temperature profile pre-established for the device; and
- assess the fit of the device using a result of the comparison.

6. The device according to claim 5, wherein the generated and pre-established temperature profiles comprise steady-state temperature profiles.

7. The device according to claim 5, wherein the generated and pre-established temperature profiles comprise dynamic temperature profiles representative of warming of the device prior to achieving a steady state temperature.

8. The device according to claim 1, wherein the controller is configured to:
- generate a temperature gradient using sensor signals produced by at least two temperature sensors;
- compare the temperature gradient to a threshold; and
- assess the fit of the device using a result of the comparison.

9. The device according to claim 1, wherein the controller is configured to:
- generate a plurality of temperature gradients using temperature signals produced by respective pairs or combinations of three or more temperatures sensors;
- compare the temperature gradients to at least one threshold; and
- assess the fit of the device using a result of the comparison.

10. The device according to claim 8, wherein the threshold is a threshold pre-established for the device.

11. The device according to claim 8, wherein the threshold is a threshold pre-established for the device and the wearer.

12. The device according to claim 1, wherein the device is:
- a restricted medical hearing device;
- a hearing aid;
- an over-the-counter (OTC) hearing device;
- a consumer hearing device;
- a consumer sound amplifier; or
- a consumer earbud.

13. A method implemented by an ear-worn electronic device configured for deployment in, on or about an ear of a wearer, the method comprising:
- generating sensor signals by a temperature sensor arrangement of the device in response to heat generated in the wearer's ear;
- receiving the sensor signals by a controller;
- assessing, by the controller, a fit of the device in the wearer's ear using the sensor signals; and
- generating, by the controller, an output indicative of the device fit assessment.

14. The method according to claim 13, wherein:
- the temperature sensor arrangement comprises two temperature sensors spaced apart from one another; and
- the method comprises:
  - generating a temperature gradient using sensor signals produced by the two temperature sensors;
  - comparing the temperature gradient to a threshold; and
  - assessing the fit of the device using a result of the comparison.

15. The method according to claim 13, wherein:
- the temperature sensor arrangement comprises three or more temperature sensors spaced apart from one another; and
- the method comprises:
  - generating a plurality of temperature gradients using temperature signals produced by respective pairs or combinations of the three or more temperatures sensors;
  - comparing the temperature gradients to at least one threshold; and
  - assessing the fit of the device using a result of the comparison.

16. The device according to claim 1, wherein
- the housing is configured to provide a sealed fit with respect to the wearer's ear; and
- the controller is configured to assess the sealed fit of the device using the sensor signals.

17. The device according to claim 1, wherein:
- the housing is configured to provide an unsealed fit with respect to the wearer's ear; and
- the controller is configured to assess the unsealed fit of the device using the sensor signals.

18. The device according to claim 1, wherein:
- the device comprises an audio processing facility; and
- the controller is configured to:
  - produce an output indicative of the fit assessment; and
  - communicate the output to an ear drum of the wearer's ear via the audio processing facility.

19. The device according to claim 1, wherein:
- the device comprises a wireless communication device; and
- the controller is configured to:
  - produce a signal indicative of the fit assessment; and cooperate with the wireless communication device to transmit the signal to an external device or system.

20. The device according to claim 1, wherein the controller is configured to detect a trigger event and initiate device fit assessment in response to the trigger event.

21. The device according to claim 20, wherein:

the trigger event comprises a change in temperature measured by the temperature sensor arrangement relative to a threshold; or the trigger event comprises a rate of change in temperature measured by the temperature sensor arrangement relative to a threshold.

22. The device according to claim 20, wherein:

the device comprises an auxiliary sensor configured to generate auxiliary sensor signals; and the trigger event is detected by the controller in response to the temperature sensor signals and the auxiliary sensor signals.

23. The device according to claim 1, wherein:

the controller is configured to detect an initiation signal and initiate device fit assessment in response to the initiation signal; and the initiation signal comprises a signal generated by a button of the device in response to a wearer input or a signal received from an external communication device.

* * * * *